United States Patent [19]

Keller

[11] 4,281,539
[45] Aug. 4, 1981

[54] MEASURING APPARATUS, ESPECIALLY FOR MEASURING FORCES ACTING UPON A BEARING OR THE LIKE

[75] Inventor: Rolf Keller, Pfaffhausen, Switzerland

[73] Assignee: SRO-Kugellagerwerke J. Schmid-Roost AG, Zürich, Switzerland

[21] Appl. No.: 74,114

[22] Filed: Sep. 10, 1979

[30] Foreign Application Priority Data

Sep. 20, 1978 [CH] Switzerland ..................... 9839/78

[51] Int. Cl.³ ........................... G01L 5/10; G01L 1/22
[52] U.S. Cl. ................................................. 73/862.54
[58] Field of Search ................................. 73/143, 144

[56] References Cited
U.S. PATENT DOCUMENTS 3,413,846  12/1968  Flinth ............................. 73/144 X
4,015,468   4/1977  Simon .............................. 73/143
4,112,751   9/1978  Grünbaum ...................... 73/144 X Primary Examiner—Charles A. Ruehl
Attorney, Agent, or Firm—Michael J. Striker

[57] ABSTRACT

A measuring apparatus for measuring forces acting upon a bearing, particularly the radial forces, effective at a roller bearing. The measuring apparatus essentially comprises two rings, typically formed of metal, which are concentrically interconnected by means of a web. The roller bearing transmits the force to be measured to one of the rings, whereas the other ring is fixed. The one ring rocks or moves in relation to the fixed ring and the deformation prevailing at the web is electrically measured and indicated in a display or indicator device. The measuring apparatus serves for measuring the tension in belts, bands, and the like.

6 Claims, 2 Drawing Figures

U.S. Patent  Aug. 4, 1981  4,281,539
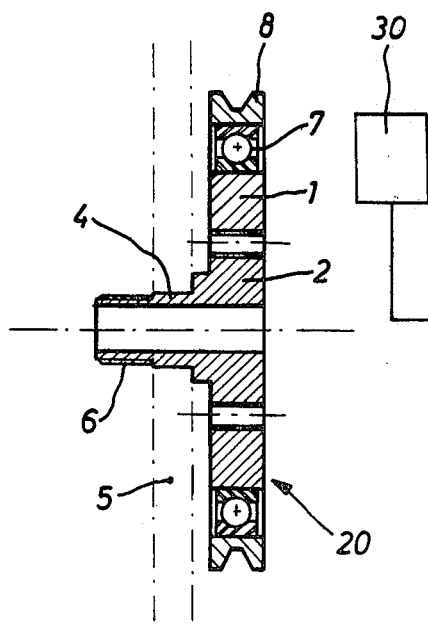
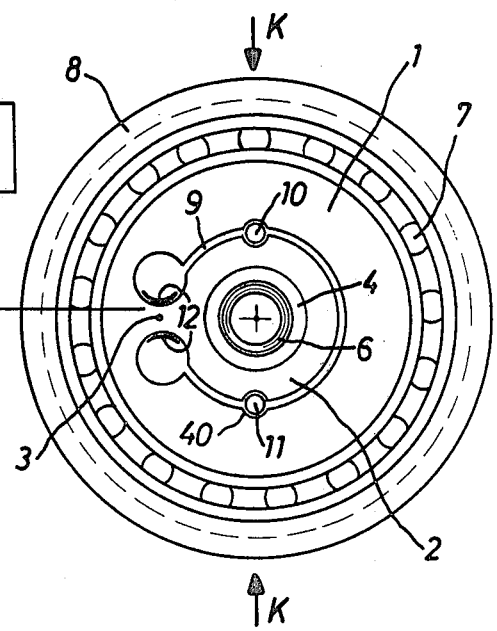

MEASURING APPARATUS, ESPECIALLY FOR MEASURING FORCES ACTING UPON A BEARING OR THE LIKE

BACKGROUND OF THE INVENTION

The present invention relates to a new and improved construction of apparatus for measuring the forces which are effective at a bearing, particularly radial forces which act upon a roller bearing or the like.

Generally speaking, the measuring apparatus of the invention is of the type comprising two concentric rings interconnected with one another by means of a radial web. This web constitutes an elastically deformable element which deforms under the influence of a force when is to be measured, and thus, effects an electric signal transmitter.

With such type measuring equipment, there can be measured or monitored, for instance, the tension or stresses which prevail at belts, bands, wires and so forth, at processing machines of the textile, paper or plastic industries. Equally, it is possible to control the load conditions prevailing at conveyor belts or bands and so forth.

With a heretoforth known measuring apparatus of the described type, there is measured the pivotal movement of the inner ring with respect to a fixed outer ring. This measuring apparatus which basically is extemely compact and simple in design, is however associated with the drawback that, owing to the roller bearing which must be housed within the inner ring, its use is limited to certain fields of application, or, however, there are required complicated force transmission systems. To be able to measure or monitor forces which are effective upon rolls and the like there are required two measuring devices, each mounted at one of the roll ends.

SUMMARY OF THE INVENTION

Therefore, with the foregoing in mind, it is a primary object of the present invention to provide a new and improved construction of measuring apparatus of the character described, which is not associated with the aforementioned drawbacks and limitations of the prior art proposals.

Yet a further significant object of the present invention aims at providing a new and improved construction of measuring apparatus for measuring the forces acting upon anti-friction bearings, particularly the radial force effective at a roller bearing or the like, which measuring apparatus is relatively simple in construction and design, extremely reliable in operation, easy to use, and provides accurate measurement results.

Now in order to implement these and still further objects of the invention, which will become more readily apparent as the description proceeds, the invention contemplates that one of both rings is optionally provided with means for its attachment and the other ring is structured for receiving or housing the bearing, in order to carry out a pivotal movement with respect to the fixed ring under the influence of the force which is to be measured.

The measuring apparatus is preferably designed such that the inner ring is equipped with attachment means and the bearing, by means of which there is transmitted the force to be measured, is mounted at the outer circumference of the outer ring.

There can be arranged upon the outer ring, for instance a roller bearing, the race of which carries an element for transmitting the force which is to be measured. This element can be constituted by a ring having a cable groove or the like, a roll cylinder and so forth.

The attachment means advantageously comprises an attachment plug or journal which may protrude axially from one or both faces of the inner ring.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a measuring device constructed according to the invention, having a roller bearing (cable roll) mounted upon the external ring; and FIG. 2 is a vertical sectional view through the apparatus shown in FIG. 1.

DETAILED DESCRIPTION OF THE PREFERRED EMBODIMENTS

Describing now the drawings, the measuring apparatus illustrated by way of example in FIGS. 1 and 2 will be seen to comprise a steel disk, generally indicated by reference character 20, which has been machined such that it contains two concentric rings 1 and 2. These concentric rings 1 and 2 are interconnected by a radial web 3 or the like. The inner ring or ring number 2 contains an attachment plug or journal 4 or equivalent structure, rendering possible the securement of the ring 2 at, for instance, a housing portion or frame 5 thereof. Attachment can be accomplished in any suitable manner, for instance by means of a nut (not shown) which can be threaded onto the thread 6 of the ring 2.

Now in the exemplary embodiment under discussion, a roller bearing 7, upon which there is mounted a cable ring or pulley portion 8, is seated upon the outer circumference of the outer ring 1. The force K which is to be measured should be effective approximately in the direction of the arrow of FIG. 1, so that there occurs a deformation within the web 3 which can be detected as uniformly as possibly. The measuring apparatus is to be of course mounted in accordance with the direction of the force which is known.

The stresses or forces arising at the web 3 can now be detected in conventional fashion and transmitted to a standard signal transmitter, generally indicated schematically in FIG. 1 by reference character 30. Such electrical signal transmitter 30 can work, for instance, according to capacitive or inductive techniques. However, it is particulary advantageous if the measurement is accomplished by means of strain gauges 12, mounted at the web 3. The detected signals are then transmitted by means of a measuring cable (not shown) or the like to a display or indicator device, which, if desired, can control certain function of a machine, for instance its drive.

Now at the gap or space between the inner ring 2 and the outer ring 1 there can be arranged in suitable recesses 40 the bolts 10 and 11 or equivalent structure, protecting the web 3 against overload.

While there are shown and described present preferred embodiments of the invention, it is to be distinctly understood that the invention is not limited thereto, but may be otherwise variously embodied and practiced within the scope of the following claims. Accordingly,

What is claimed is:

1. An apparatus for measuring the forces, particularly the radial forces acting upon a bearing, especially a roller bearing, comprising:

two concentric ring members interconnected by web means;

said web means constituting an elastically deformable element which deforms in the presence of a force which is to be measured and is capable of influencing an electric signal transmitter;

the inner one of said ring members being equipped with attachment means, for the fixation thereof, and the outer one of said ring members being structured for receiving the bearing so that said outer ring member, in the presence of the force which is to be measured, is capable of carrying out a pivotal movement with respect to said inner ring member, said attachment means comprising an attachment plug means which axially protrudes from at least one face of the inner ring member.

2. The measuring apparatus as defined in claim 1, wherein:

said bearing constitutes a roller bearing having an inner race seated upon the outer circumference of the outer ring member; and said roller bearing having an outer race carrying an element for transmitting the force to be measured.

3. The measuring apparatus as defined in claim 1, wherein:

said attachment plug means possesses an axial bore for the throughpassage of a measuring cable.

4. The measuring apparatus as defined in claim 1, wherein:

both of said ring members and said attachment plug means are formed of one-piece.

5. The measuring apparatus as defined in claim 1, wherein:

said attachment plug means is pressed into said inner ring member.

6. The measuring apparatus as defined in claim 1, wherein:

both of said ring members are arranged in a common housing means.

* * * * *